Jan. 13, 1953   A. E. JOEL, JR   2,625,610
RELAY PERMUTATION-TYPE SWITCHING SYSTEM
Filed Dec. 5, 1947   11 Sheets-Sheet 6

INVENTOR
A. E. JOEL, JR.
BY R. O. Covell
ATTORNEY

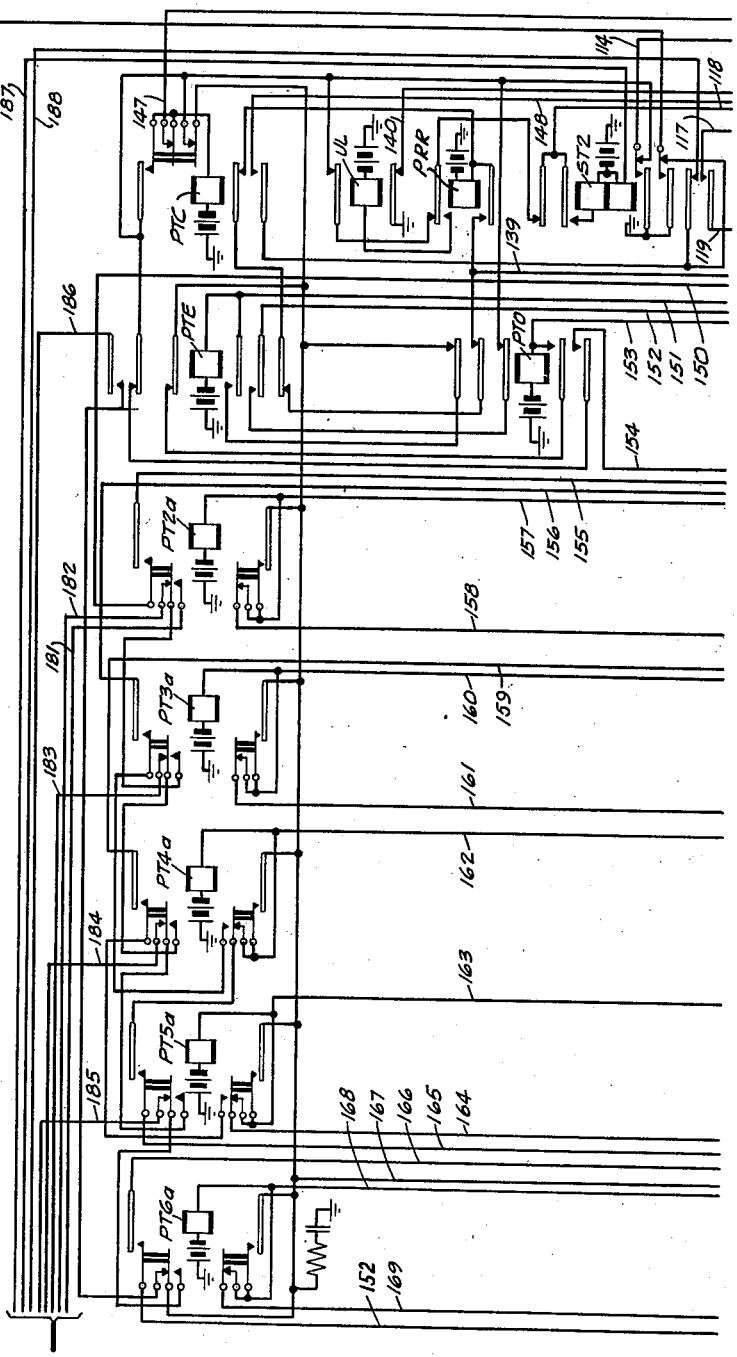

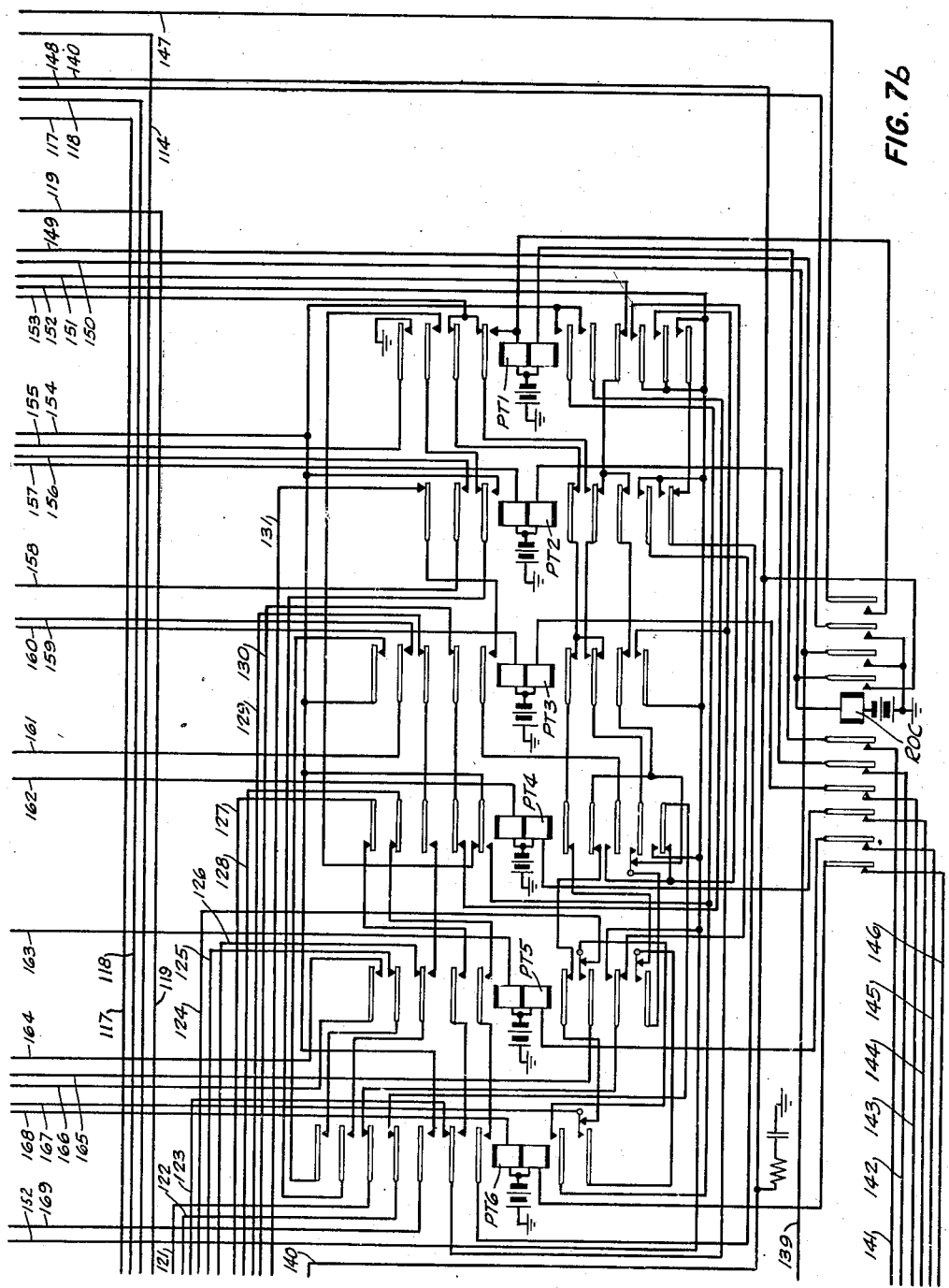

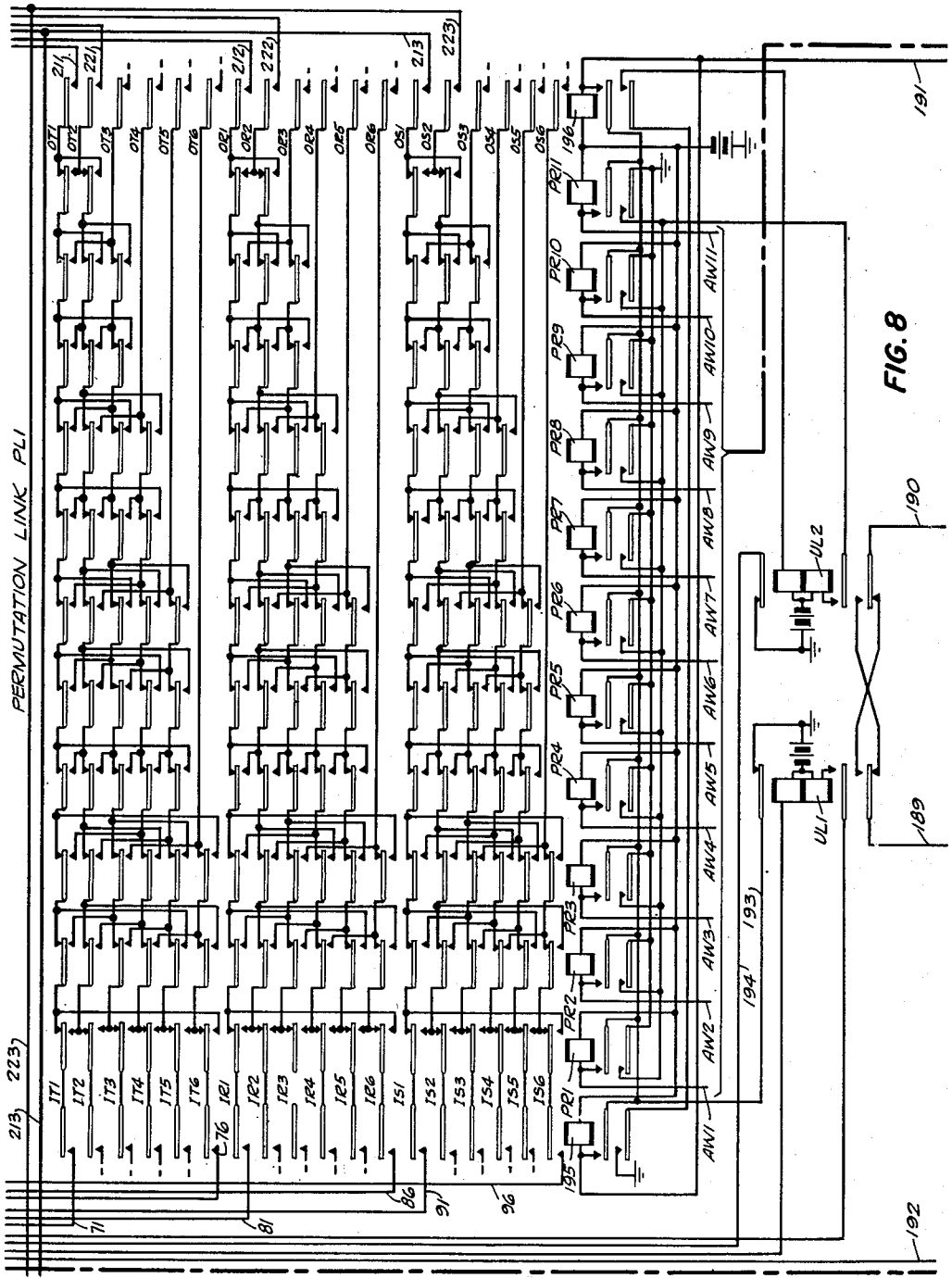

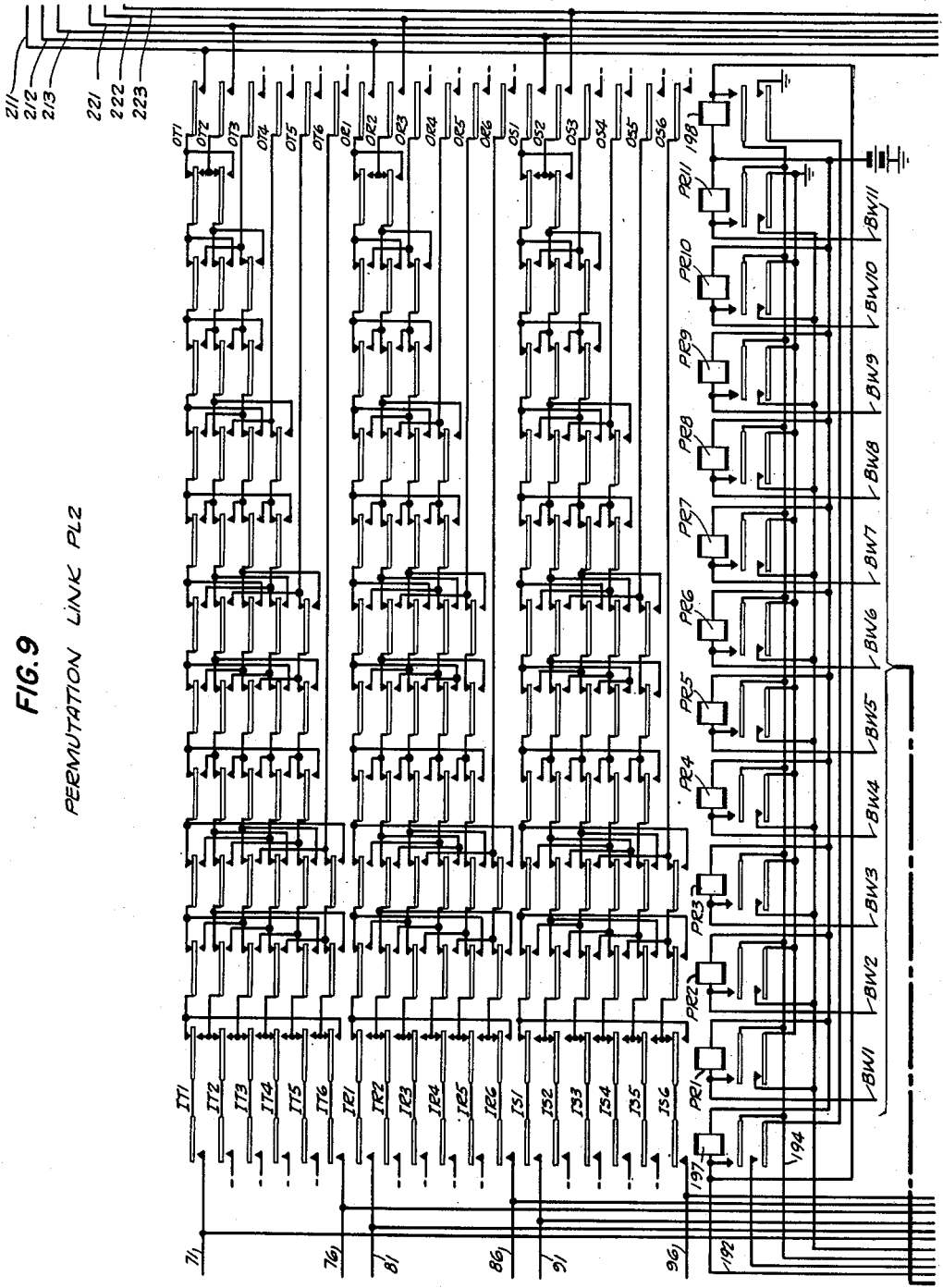

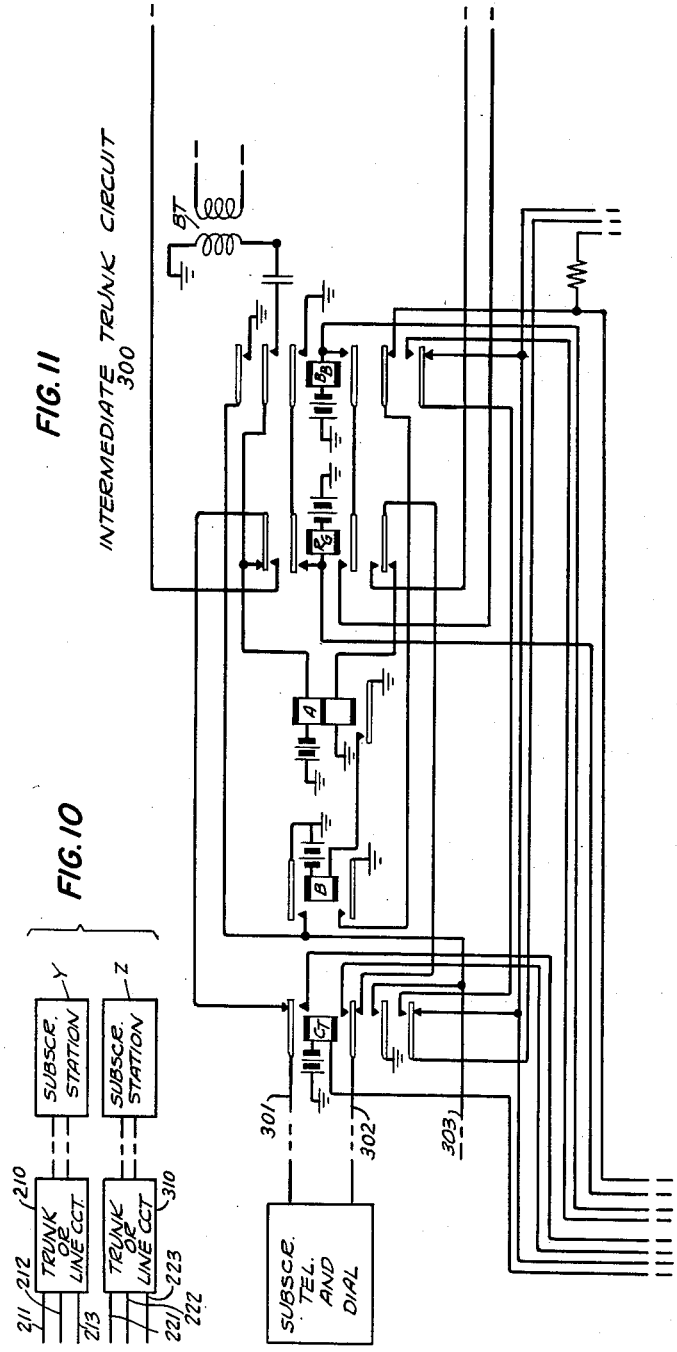

Patented Jan. 13, 1953

2,625,610

UNITED STATES PATENT OFFICE 2,625,610

RELAY PERMUTATION-TYPE SWITCHING SYSTEM

Amos E. Joel, Jr., New York, N. Y., assignor to Bell Telephone Laboratories, Incorporated, New York, N. Y., a corporation of New York Application December 5, 1947, Serial No. 789,789

14 Claims. (Cl. 179—18)

1

This invention relates to switching systems and particularly to electro-magnetic switching such as automatic switching in telephone and telegraph systems.

Objects of the invention are the provision of improved and simplified automatic switching arrangements for interconnecting lines and trunks in communication systems and an increase in the availability and efficiency in the use of groups of lines or trunks to establish desired connections.

This invention is a switching system in which any one of a plurality of lines or trunks in one group may be connected with any desired one of a plurality of lines or trunks in another group, the connecting means being so arranged that the incoming lines or trunks may be connected to the outgoing lines in any of the possible permutations of such connections.

According to a feature of the invention a link circuit for connecting each of a group of communication lines to any desired one of another group of communication lines comprises successive stages of switching relays, each stage being arranged to connect one less line in each group, whereby the lines of the first group may be connected to the lines of the other group by the operation of any one of the different combinations of said switching relays.

According to another feature of the invention a pair of link circuits is provided, each arranged for simultaneously connecting each line of a first group to a different one of a second group of lines, whereby the lines of the first and second groups may be interconnected in any one of the possible different combinations, means being provided to change the combination whenever it is desired that a particular line in the first group be connected to a different line in the second group, control means being provided to establish the new combination through one of the links while the previous combination is maintained through the other link and then to establish the new combination through the said one of the links.

The invention and its features will be further explained by describing a system in which the invention is embodied, one such system being shown schematically in the drawing which forms a part of this specification. The invention is not limited in its application to the particular type of system shown, or to switching means of the type described, but is generally applicable to automatic switching and particularly in communication systems.

Referring to the drawing, which consists of twelve figures and shows in schematic form an automatic telephone system:

Fig. 1 shows two subscriber stations and lines and two of a group of line or incoming trunk circuits;

2

Figs. 7a and 7b show a permutation translating circuit;

Figs. 8 and 9 show permutation link circuits PL1 and PL2;

Fig. 10 shows two outgoing trunk circuits and two subscriber stations;

Fig. 11 shows an intermediate trunk circuit; and

Fig. 12 shows the position in which Figs. 1 to 10 inclusive, are to be placed to form an operative system.

General description

Figure 1:
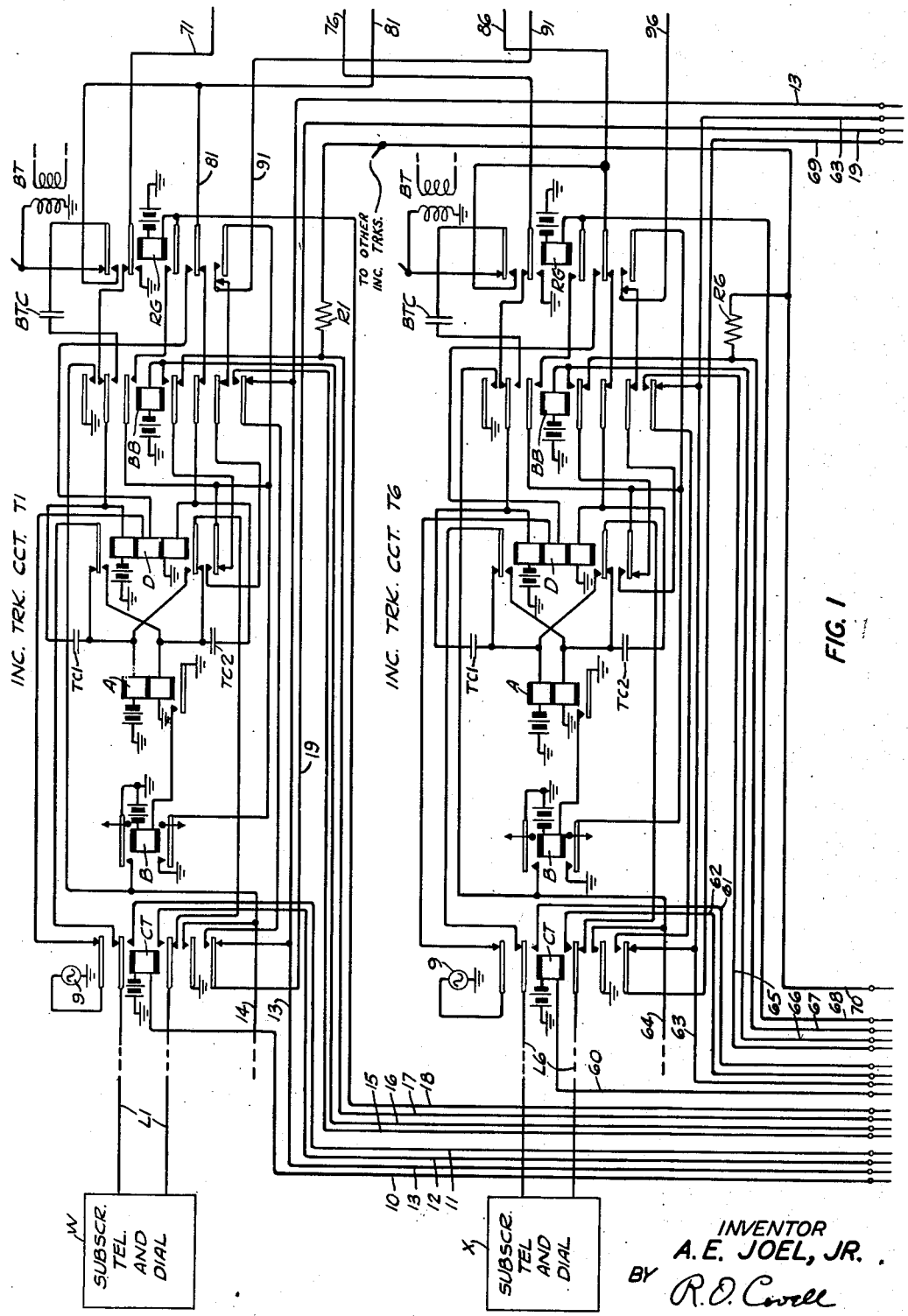

The subscriber stations W, X, Y and Z shown in Figs. 1 and 10 may be of the usual common battery type provided in automatic telephone systems, each including a dial for transmitting digit impulses to control the establishment of desired connections. Each of the stations W and X are shown connected directly by lines L1 and L6 to the incoming trunk circuits T1 and T6 whereby these trunk circuits take on the character of line circuits. The lines L1 and L6 may, however, be connected through line finders or other intermediate switching devices to the trunk circuits. While not shown, a permutation link may be used as a finder switching stage. Each of the trunk circuits T1 and T6 is arranged to provide talking battery through the windings of relay A to the associated calling station and through the windings of relay D to a connected called line; and voice currents are transmitted through condensers TC1 and TC2. Relay B is a slow to release relay which connects busy marking and holding ground potential to the sleeve conductor 14. Relay CT, when operated, connects the associated calling line to a finder-register circuit FR1 or FR2. Relay RG controls the transmission of a ringing signal to the connected called line; and relay BB operates in case the called line is busy to transmit a busy tone to the calling station.

The intermediate trunk circuit shown in Fig. 11 is similar to the incoming trunk circuits 1 and 2 except that it is not arranged for feeding talking battery to subscriber stations.

Figure 2:
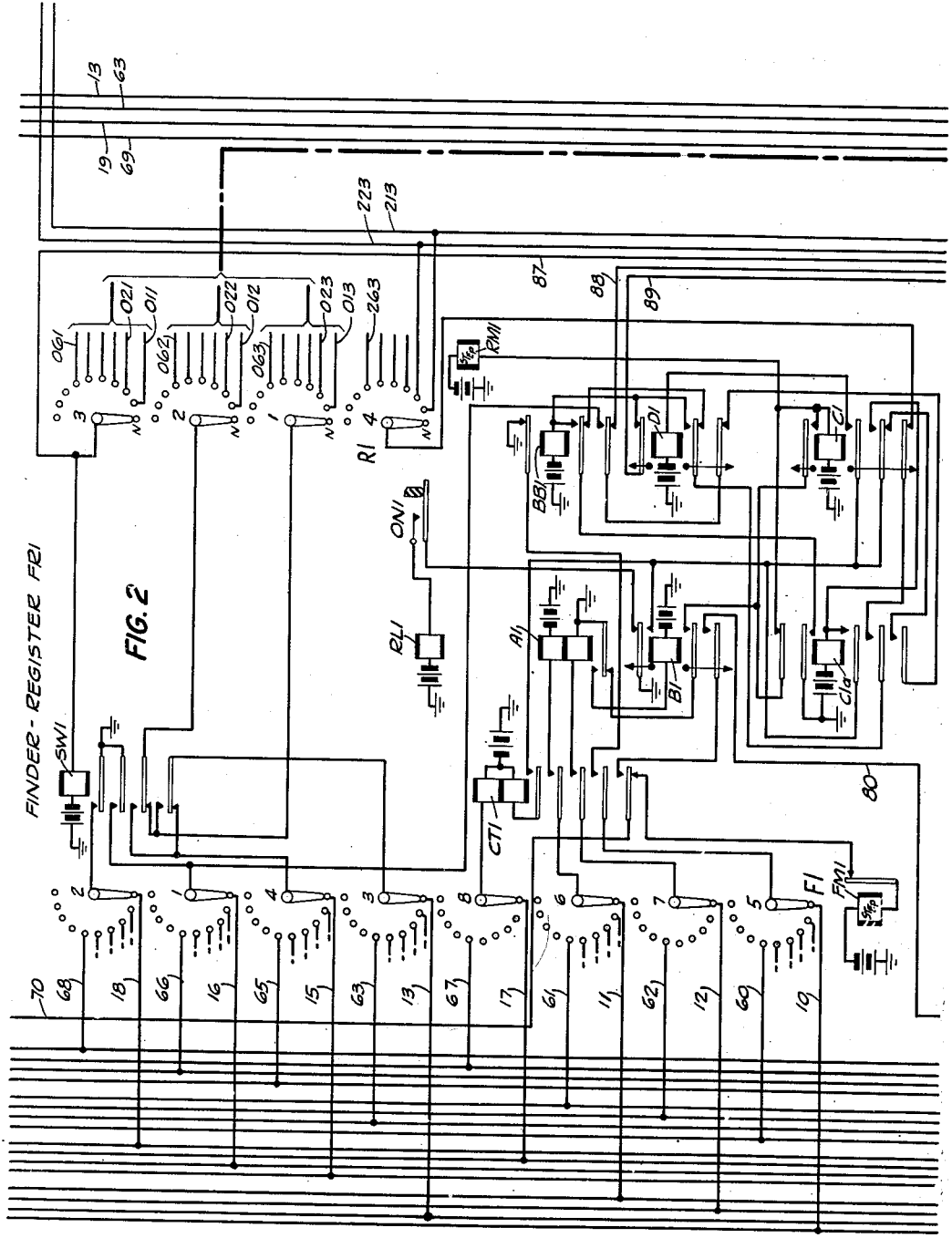
Figs. 2 and 3 show finder-register circuits FR1 and FR2.
Figure 3:
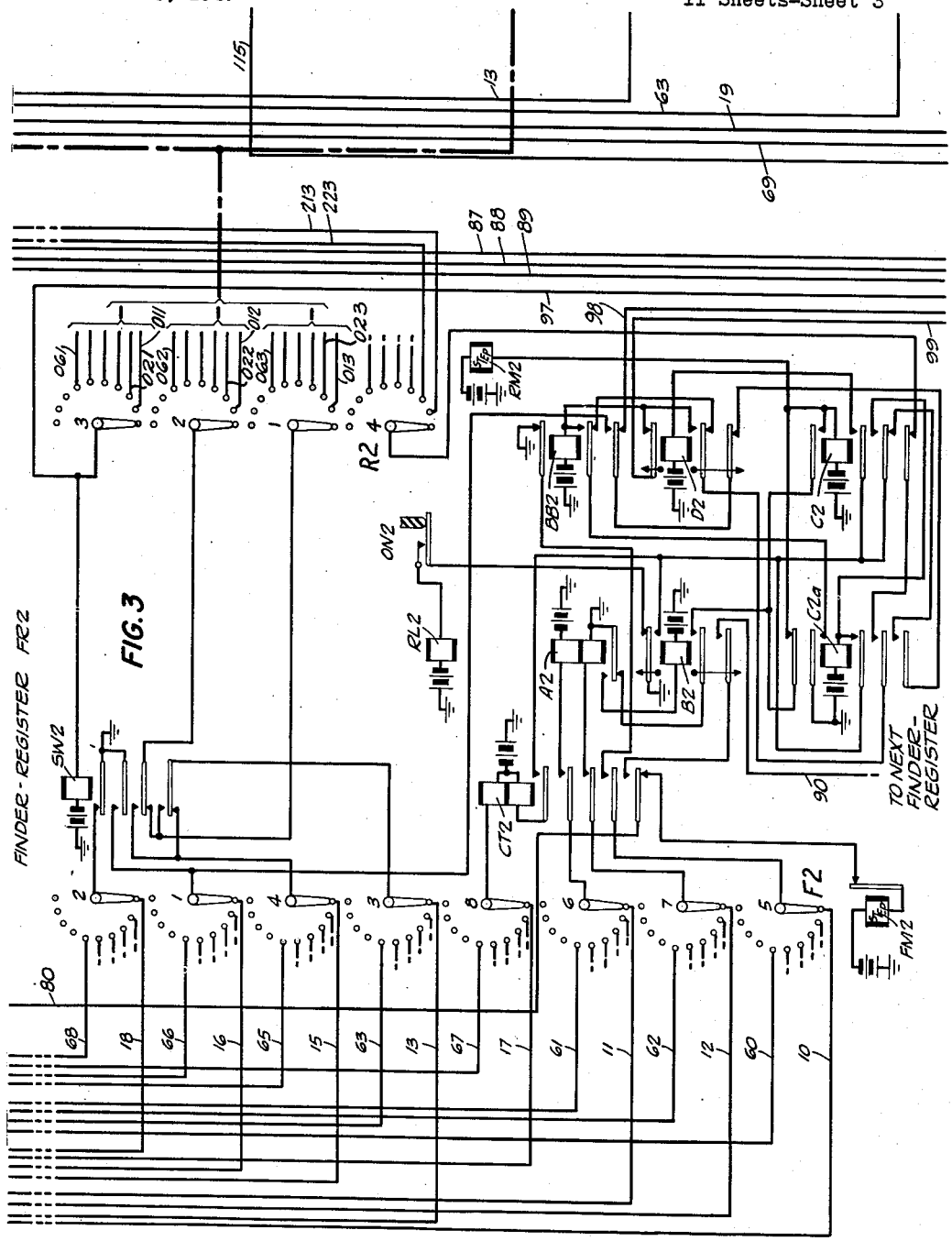

Each of the two finder-registers FR1 and FR2 shown in Figs. 2 and 3 comprises a rotary finder switch F1 or F2, a rotary register switch R1 or R2 and a plurality of control relays. The finder switch has a stepping magnet and 8 wipers and associated terminal banks through which the finder has access to each of the incoming trunks in a group including the trunk circuits 1 and 6 shown in Fig. 1. The finder switches are of the stay-put type and are self-allotting; so that one of them is started in operation when an incoming trunk circuit is seized, as hereinafter described in detail. The register switch of each finder-register circuit comprises a stepping magnet, a release magnet, four wipers and associated terminal banks. The wipers have a normal position to which they are restored at the end of a cycle of operation.

Figure 4:
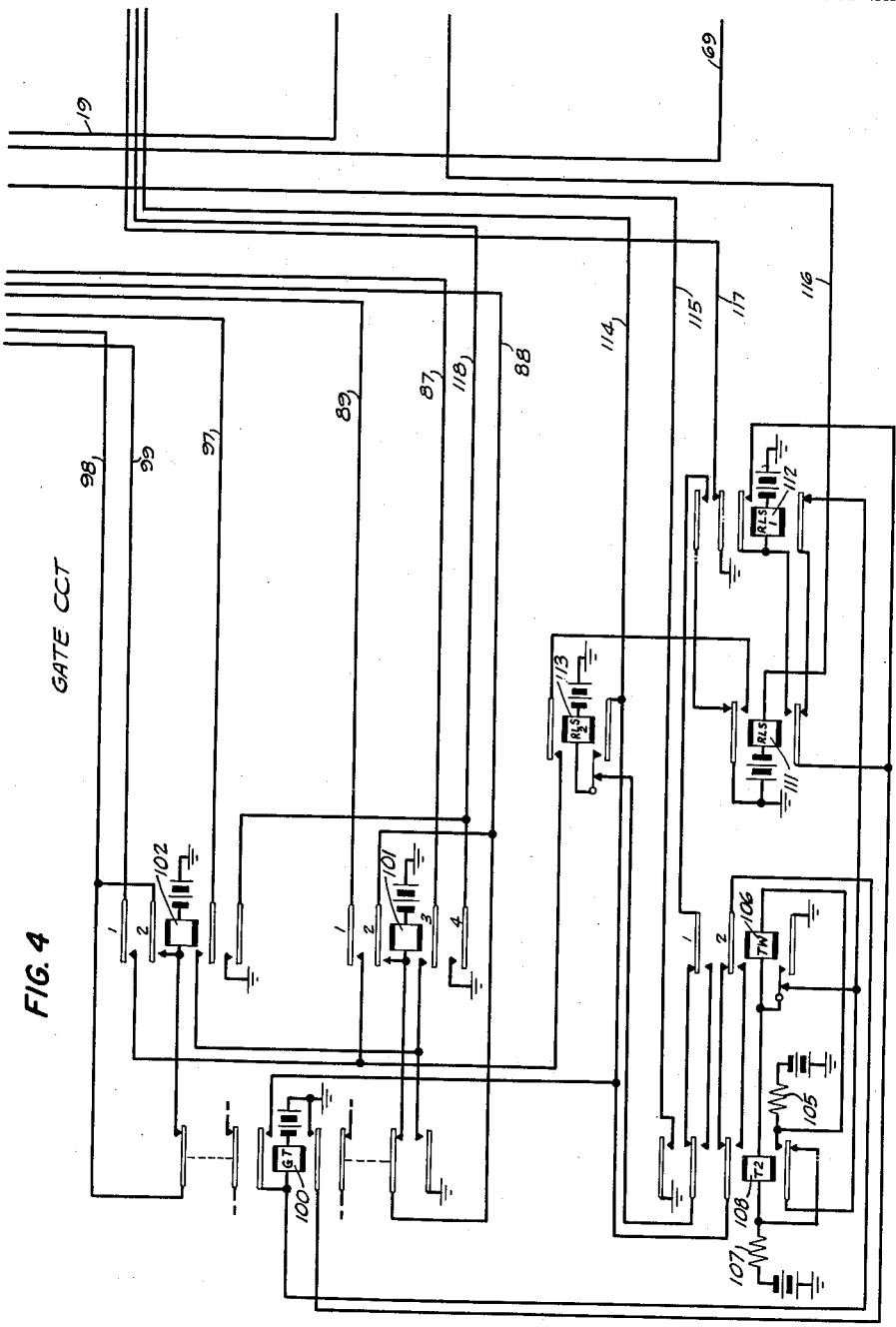
Fig. 4 shows a gate circuit.

The gate circuit shown in Fig. 4 comprises line relays 101 and 102, one for each finder-register circuit and a common gate relay 100 and auxiliary control relays 106, 108, 111, 112 and 113, arranged to operatively connect the finder-registers, one or more at a time, with the permutation control and translating circuits.

The permutation link circuits PL1 and PL2 are each arranged to interconnect a group of six subscriber lines or incoming trunks with a group of six outgoing or intermediate trunks or subscriber lines. Each permutation link comprises an incoming line cut-through relay 195 or 197, an outgoing line cut-through relay 196 or 198, and eleven switching relays PR1 to PR11 for connecting the six incoming lines with the six outgoing lines in each of the different connecting arrangements which are possible. Each of switching relays PR1, PR2 and PR3 has contacts for connecting six incoming lines with six outgoing lines; each of switching relays PR4, PR5 and PR6 has contacts for connecting five incoming lines with five outgoing lines; each of switching relays PR7 and PR8 has contacts for connecting four incoming lines with four outgoing lines; each of switching relays PR9 and PR10 has contacts for connecting three incoming lines with three outgoing lines; and switching relay PR11 has contacts for connecting two incoming lines with two outgoing lines. While the links shown are arranged to connect an equal number of incoming and outgoing lines, this is not necessary and each group may include any number of lines. The relays UL1 and UL2 shown in Figure 8 together with relay TF shown in Fig. 6 constitute a transfer circuit controlling the alternate use of the permutation links and their connection to the permutation control link and translating circuits.

Figure 5:
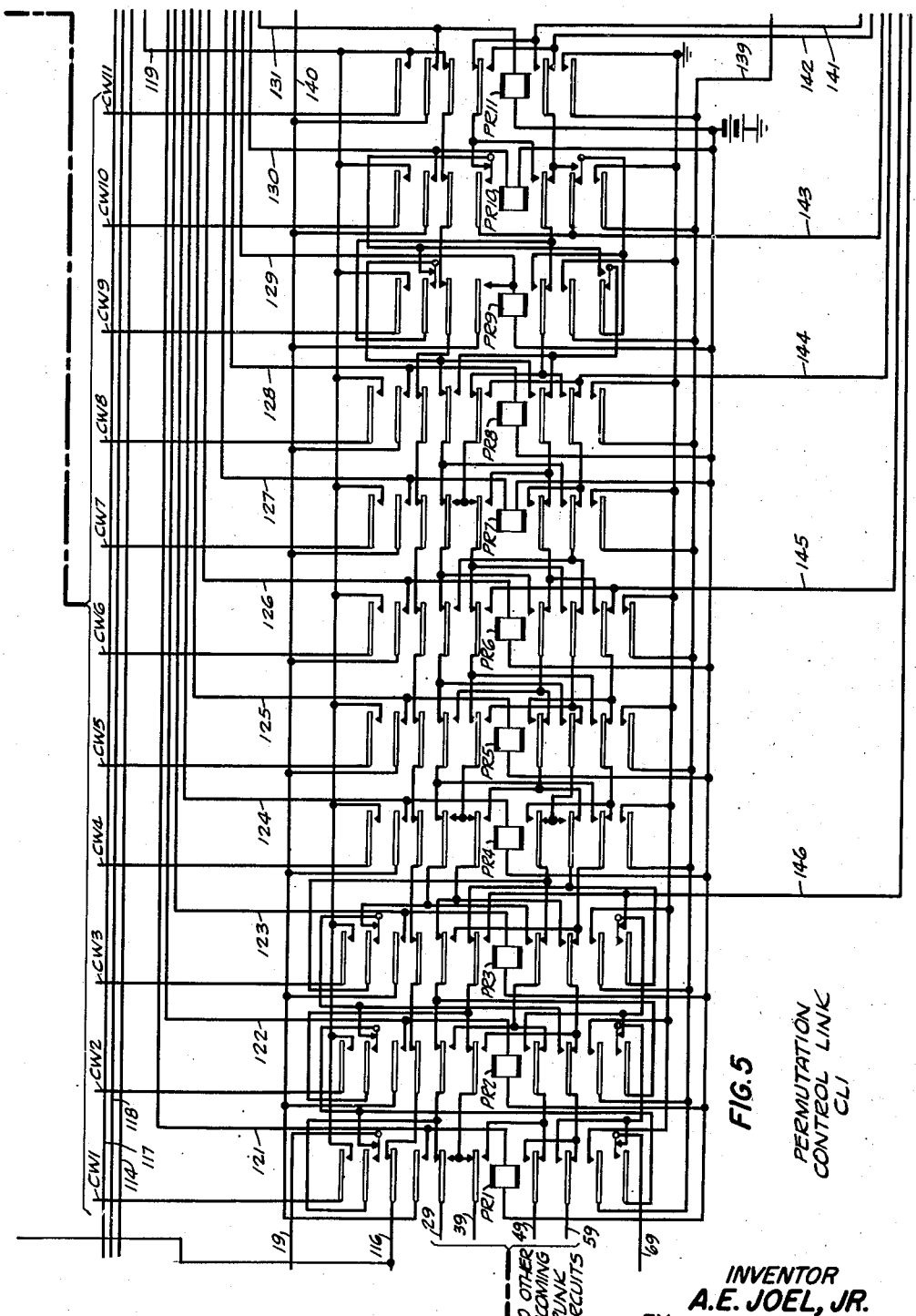
Figs. 5 and 6 show two permutation control links CL1 and CL2, a permutation link transfer relay and part of the permutation translating circuit.
Figure 6:
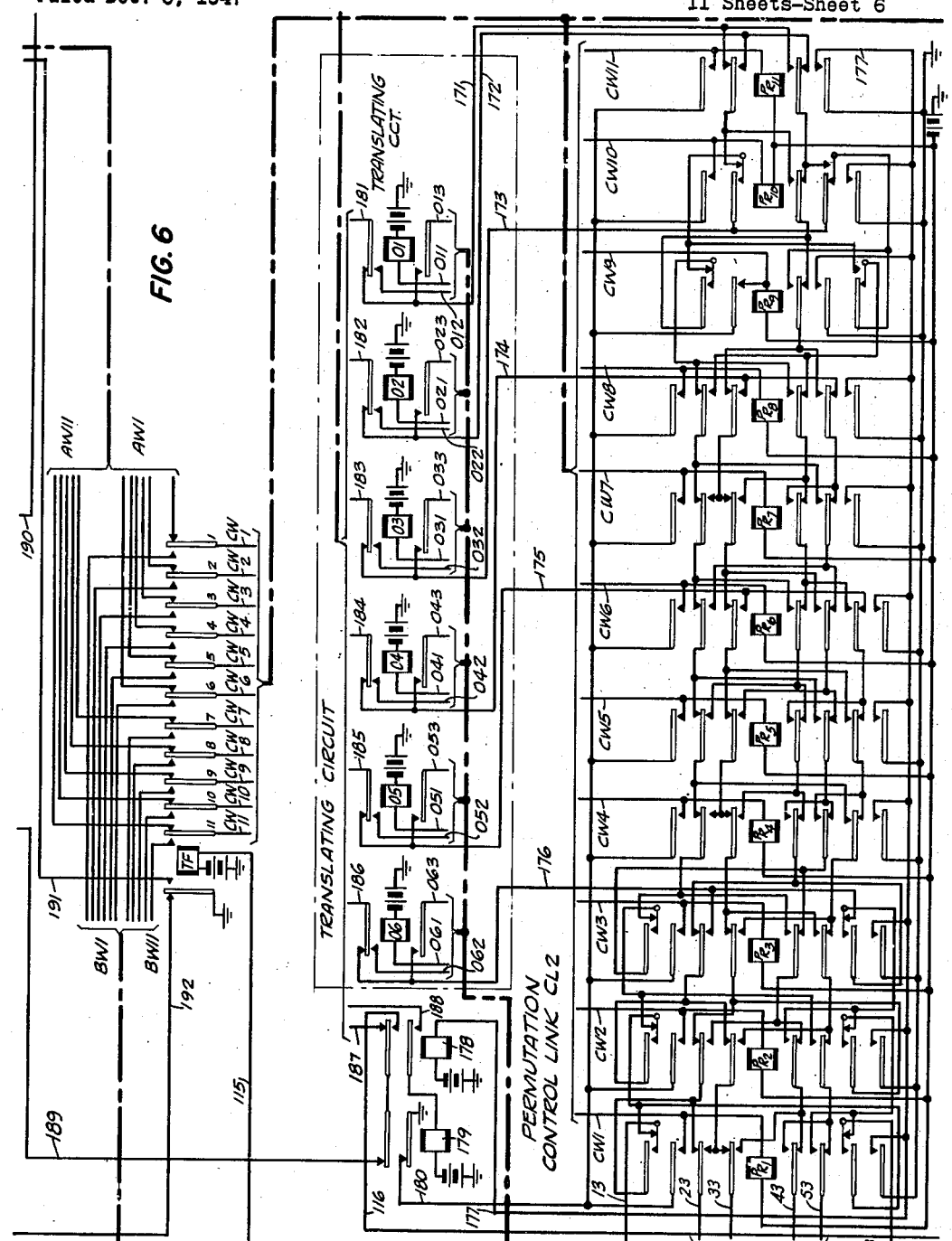

The permutation control link CL2 shown in Fig. 6 comprises relays PR1 to PR11 which are connected, under control of the transfer relay TF, for operation to register the same connecting combination as exists in the connected one of the permutation links PL1 and PL2. The permutation control link CL1 shown in Fig. 5 comprises relays PR1 to PR11 which are operatively controlled by the permutation translating circuit of Figs. 7a and 7b to register the new combination to which the one or the other of the permutation links is to be operated to establish the new desired connections, as registered by the finder-register circuits which are at that time operatively connected to the permutation control link and translating circuits, and to also register the old connections which are to be continued.

The permutation translating circuit comprises the outgoing trunk relays O1 to O6 shown in Fig. 6 and a plurality of relays in Figs. 7a and 7b for effecting the operation of the permutation control link CL1 as required to control the switching relays of the one or the other of the permutation links to establish a new connecting combination which will continue the existing connections between calling and called trunks or lines and which will also establish connection of other calling and called trunks or lines as registered by the finder-register circuits then in operative connection with the permutation control and translating circuits.

When a call is initiated at a subscriber station and the calling line is connected to one of the incoming trunk circuits T1 to T6, the finder switch of an idle one of the finder-registers FR1 and FR2 is operated to connect the associated register switch through the incoming trunk circuit to the calling line. When the calling subscriber dials the digit representing a called line, the register switch is selectively positioned to mark the corresponding outgoing trunk. As soon thereafter as the permutation control links and translating circuit are idle, the gate circuit operates to connect the finder-register in question to the translating circuit. All finder-registers which have been selectively operated to register the called line digit, are simultaneously connected with the translating circuit by the operation of the gate relay 100 of the gate circuit, whereby one or more of the outgoing trunk relays O1 to O6 are operated according to the called line digits registered in the connected finder-register circuits. At this time the PR relays of the permutation control link CL2 are locked operated in the same combination as that existing in the one or the other of permutation links PL1 and PL2; and the translating circuit proceeds to operate that combination of the PR relays of control link CL1 which represents both the existing connections and the new desired connections between the incoming trunk circuits and the outgoing trunk circuits which are multipled to the incoming and outgoing conductors respectively of the permutation links PL1 and PL2. When the control link CL1 has been set under the control of the translating circuit, the PR relays of the control link CL2 and the PR relays of the idle one of the permutation links are operated in the same combination. When the new combination is set up by one of the permutation links, the other permutation link is released and the gate circuit operates to return the finder-registers in question to normal. The outgoing trunk relays O1 to O6 which were operated are then released, and the translating circuit is again ready for operative association with one or more of the finder-register circuits. The ROC and PRR relays of the translating circuit and the PR relays of control link CL1 remain operated in the existing combination until the gate circuit operates responsive to the initiation of new calls through one or more of the incoming trunk circuits.

*Detailed description*

Assume that a call is initiated at station W, that the line L1 is connected to incoming trunk circuit T1, that there are no other calls then existing through the group of incoming trunk circuits which are common to permutation links PL1 and PL2, and that the permutation link PL2 is set to the switching combination existing when the last preceding call through one of these incoming trunks was terminated and that this combination is the one in which none of the switching relays 1 to 11 are operated. In such a case, relay TF is normal; relays 197 and 198 of permutation link PL2 are operated; none of the relays of permutation link PL2 are operated; relay UL1 is operated and relay UL2 is not operated; none of the outgoing trunk relays O1 to O6 are operated; none of the relays of the permutation control links CL1 and CL2 are operated; and only relays PRR and ROC of the permutation translating circuit are operated, these relays having been locked at the end of the next preceding call.

When a call is initiated at station W and line L1 is connected to incoming trunk circuit T1, relay A of the trunk circuit is operated by the energization of its windings in series with the line loop. The operation of relay A closes a circuit for operating relay B, whereby relay B connects ground to conductor 14 to hold any intermediate switches or circuits included in the connection between line L1 and the trunk circuit T1. The operation of relay B also connects ground through its lower contact, lower back contact of relay D and inner lower back contact of relay BB, thence through conductor 17 to mark the terminal set of this trunk in the bank of wiper 8 of the finder switch of each of finder-register circuits FR1 and FR2. The ground potential thus connected to conductor 17 is further connected through resistor R1 of trunk T1 through start conductor 70 and lowermost back contact of relay CT1 of finder-register FR1, and through the interrupter contact of stepping magnet FM1 of the finder switch F1 to operate this stepping magnet and thereby advance the finder step by step until wiper 8 encounters the terminal to which conductor 17 is connected; whereupon relay CT1 is operated by the energization of its upper winding to prevent the further operation of the stepping magnet. With relay CT1 operated, a circuit is closed for operating relay CT of trunk circuit T1, this circuit being traced from the winding of relay CT, through conductor 16, terminal and wiper 5 of finder switch F1, a front contact of relay CT1, to ground at a back contact of relay BB1. With relay CT of the trunk and relay CT1 of the finder-register circuit FR1 operated, the line loop is transferred from the windings of the A relay of the trunk circuit, through conductors 11 and 12, wipers 6 and 7 of switch F1 and front contacts of relay CT1 to the windings of relay A1 of the finder-register circuit. Relays A and B of trunk circuit T1 are thereby released so as to disconnect ground from conductor 10 and from start conductor 70. With relay CT of the trunk circuit operated, holding ground continues to be connected to conductor 14. The operation of relay A1 closes a circuit for operating relay B1. With relay B1 operated, the start conductor 70 is extended through the lowermost front contacts of relays CT1 and B1 to the next finder-register circuit.

When the subscriber at station W dials the number of the called line, relay A1 alternately releases and reoperates as many times as there are units in the digit dialed. The first release of relay A1 closes a circuit for operating relay C1 and the stepping magnet RM1 of register switch R1, in parallel. This circuit is traced from ground through the back contact of relay A1, a front contact of relay B1 and the upper back contact of relay C1a. Relay C1 locks operated independent of relay C1a and closes circuits for operating relays C1a and D1. Relays C1a locks independent of relay C1 and opens the operating circuit of relay C1. When relay A1 reoperates, at the end of the first impulse, the stepping magnet RM1 releases, thereby stepping the wipers of switch R1 to the first off-normal set of terminals. The next and each succeeding release and reoperation of relay A1 causes a like operation and release of stepping magnet RM1 so as to advance the wipers of switch R1 to a position corresponding to the digit dialed. Being slow to release, relays B1 and C1 remain operated during the receipt of dial impulses. Relay C1 releases a predetermined interval of time after relay A1 reoperates at the end of the last dial impulse. If the called line happens to be busy, the test conductor connected to the terminal engaged by wiper 4 of switch R1 is grounded; and, when relay C1 releases, the busy test relay BB1 is operated. Assuming the register switch R1 to be set in position 1, the circuit for operating relay BB1 is traced from the winding of this relay, through the front contact of relay D1, middle lower front contact of relay C1a, back contact of relay C1, wiper 4 of switch R1, over the sleeve conductor 213 of trunk circuit 210 to ground.

If relay BB1 operates, due to the called trunk line being busy, it locks under the sole control of relay C1a before relay D1 releases. The release of relay C1 causes the release of relay D1, but relay D1 is slow in releasing to allow the test relay BB1 to operate before the above-traced operating circuit is opened. The release of relay D1 connects ground through the upper front contact of relay B1, inner back contact of relay C1, lowermost front contact of relay C1a, lowermost back contact of relay D1, outer front contact of relay BB1, wiper 1 of switch F1 and conductor 16, to operatively energize the winding of relay BB of trunk circuit T1. The operation of relay BB1 disconnects ground from conductor 10, thereby to cause the release of relay CT of trunk circuit T1, whereby relays A1 and B1 of the finder-register circuit FR1 are released and relays A and B of trunk circuit T1 are reoperated. The release of relay B1 causes the release of relays CT1, C1a and BB1 and causes the operation of release magnet RL1, thereby restoring switch R1 to normal. When the switch R1 reaches normal, the off-normal springs ON1 are restored to normal, causing the release of the release magnet RL1. The busy back relay BB in the trunk circuit T1 locks under control of relays D and B and closes a path through condenser TC for transmitting busy tone from the busy tone transformer BT to the calling station. When the subscriber at the station W returns the telephone to normal, relays A and B and BB release in succession.

If the called line is idle, the busy test relay BB1 of finder-register circuit FR1 does not operate when its winding is connected, by the release of relay C1, through wiper 4 of switch R1 to the sleeve conductor of the called trunk line. The release of relay C1 causes the release of relay D1, thereby disconnecting the sleeve conductor of the called line from the winding of relay BB1 and connecting this conductor through the inner lower back contact of relay D1 and inner lower back contact of relay BB1 to ground at the upper front contact of relay C1a, thereby marking the called trunk line busy to prevent its selection by any other finder-register circuit. The release of relay D1 also closes a connection from ground at the upper front contact of relay B1, through the inner back contact of relay C1, lowermost front contact of relay C1a, outer lower back contact of relay D1, and outer lower back contact of relay BB1 to conductor 88, thereby operating line relay 101 of the gate circuit in Fig. 4 providing gate relay 100 is at that time not operated. Assuming that relay 100 is normal and that relay 101 operates, relay 101 locks to conductor 88 independent of relay 100 and connects ground to start conductor 118, thence through a back contact of relay ST2 of the translating circuit and a front contact of relay PRR to operate relay UL. Relays PRR and ROC and any of the relays of the control permutation link 1 which were operated and locked by the next preceding call, are released when ground is disconnected from conductor 140 by the operation of relay UL of the translating circuit. The release of relay PRR causes the release of relay UL, whereby the ground connected to conductor 118 is extended through back contacts of relays ST2, PRR and UL, through another back contact of relay ST2, conductor 114, and back contacts of relays 105 and 106 to the winding of gate relay 100, thus causing the operation of gate relay 100. The release of relay UL also causes the operation of relay PTE, the operating circuit being traced from the grounded start conductor 118 through a back contact of each of relays ST2, PRR, UL and PTC, conductor 167, a back contact of each of relays PT6, PT5, PT4, PT3, PT2 and PT1, and conductor 151 to the winding of relay PTE. If there had been no previous call or if the locking ground connected to conductor 140 had been disconnected for instance, by a manual operation of relay UL, the connection of ground to conductor 118 when relay 101 operates causes the operation of relay 100 without first operating and then releasing relay UL. The operation of relay 100 opens the operating circuit of relay 101 and of all similar relays so as to prevent the operative association of any other finder-register circuit with the permutation control link and translating circuits while the finder-register circuit FR1 is operatively associated therewith. Relay 101 remains operated since it is locked to conductor 88 independent of relay 100. The operation of relay 100 causes the operation of relay 106; and, with relay 101 operated, ground is connected to conductor 87 to operate relay SW1 of the finder-register circuit FR1. Relay 106 locks independent of relays 111 and 112 and then opens its operating circuit. Relay 108 does not operate at this time since its winding is short circuited by its own lower back contact. The ground connected to conductor 87 is further extended through wiper 3 of register switch R1 in position 1, and through conductor O11 to operate outgoing trunk relay O1 of the translating circuit. The operation of relay SW1 of the finder-register circuit FR1 closes a circuit through wiper 2 of switch F1 and conductor 18 for operating relay RG of trunk circuit T1; closes a circuit through wiper 1 of switch F1 and conductor 16 for operating relay BB of the trunk circuit T1; opens the normally closed connection between wipers 1 and 2 of switch R1; opens the normally closed connection between wipers 3 and 4 of switch F1; closes a connection between wiper 2 of switch R1 and wiper 4 of switch F1; and closes a connection between wiper 1 of switch R1 and wiper 3 of switch F1. With relays RG and BB of trunk circuit T1 operated, relay RG locks under control of relays BB and B.

If while the foregoing operations are taking place, a call is originated at station X and line L6 is connected to incoming trunk circuit T6, this trunk circuit operates to start the finder switch of finder-register circuit FR2. When the wipers of finder switch F2 make contact with the terminals connected to trunk circuit T6, relay CT of the trunk circuit and relay CT2 of the finder-register circuit are operated; relays A and B of the trunk circuit release; and relays A2 and B2 of finder-register circuit FR2 are operated. When the subscriber at station X dials the number of the called line, the register switch R2 is advanced to a corresponding position. If the called line is idle, relay BB2 of the register circuit does not operate and the called line is marked busy through wiper 4 of switch R2. If relay 100 of the gate circuit has been operated, the line relay 102 cannot operate to connect the finder-register circuit FR2 to the permutation control link and translating circuits and the switching relay SW2 cannot be immediately operated; in which case, the call from station X must now wait for release of the permutation control link and translating circuits. However, if both of relays 101 and 102 in the gate circuit should be operated before gate relay 100 operates, the operation of relay 100 effects both the operation of relay SW1 of finder-register FR1 and the operation of relay SW2 in finder-register FR2; whereby relays RG and BB of trunk circuit T6 are operated and, assuming register switch R2 to be set in position 2, a circuit is closed through wiper 3 of switch R2 and conductor O21 for operating outgoing trunk relay O2 in the translating circuit.

With both of relays SW1 and SW2 operated, the aforementioned operation of relay PTE of the translating circuit closes a connection from the grounded start conductor 118 through a back contact of each of relays ST2, PRR, UL, PTC, and PT6a, a front contact of relay PTE, conductor 186, back contact of relay O6, conductor 176, a back contact of each of relays PR3, PR2 and PR1 of control link CL2, conductor 63, wiper 3 of switch F2 of finder-register FR1, front contact of relay SW2, wiper 1 of switch R2 in position 2, conductor O23, a front contact of outgoing trunk relay O2, conductor 172, a back contact of each of relays PR11, PR10, PR9, PR8, PR7, PR6, PR5, PR4, PR3, PR2 and PR1 of control link CL2, conductor 23, a back contact of relay CT of incoming trunk circuit T2 (which is not shown), conductor 29, a back contact of each of relays PR1, PR2, PR3, PR4, PR5, PR6, PR7, PR8, PR9, PR10 and PR11 of control link CL1, conductor 142, a back contact of relay ROC of the translating circuit to the lower winding of relay PT2.

The operation of relay PT2 closes a circuit for operating relay PR1 of control link CL1, this circuit being traced from the winding of relay PR1 through conductor 121, a back contact of each of translating circuit relays PT6 and PT5, a front contact of relay PT2, conductor 152, a front contact of relay PTE, a back contact of relay PT0, and a back contact of each of relays UL, PRR and ST2 to the grounded start conductor 118. Relay PR1 locks through conductor 140 to ground at a back contact of relay UL in the translating circuit. With relay PR1 of control link CL1 operated, conductor 29 is transferred to open the operating circuit of relay PT2 and close an operating circuit for relay PT3, thereby causing the release of relay PT2 and the operation of relay PT3. The operating circuit of relay PT3 is traced from conductor 29 through a front contact of relay PR1 and a back contact of each of relays PR2, PR3, PR4, PR5, PR6, PR7, PR8, PR9 and PR10, conductor 143, a back contact of relay ROC to the lower winding of relay PT3. The operation of relay PT3 closes a circuit for operating relay PR3 of control link CL1, which circuit is traced from the winding of relay PR3 through conductor 123, a back contact of relay PT6 and a front contact of relay PT3 to the grounded conductor 152. Relay PR3 locks to conductor 140; opens the operating circuit of relay PT3, whereby relay PT3 releases; and closes a circuit for operating relay PT6. This circuit includes the aforementioned conductor 29, a front contact of relay PR1, a back contact of relay PR2, a front contact of relay PR3, conductor 146, a back contact of relay ROC and the lower winding of relay PT6. With relay PT6 operated, a circuit is closed for operating relay PT0; this circuit is traced from the winding of relay PT0 through conductor 153, a back contact of each of relays PT1, PT2, PT3, PT4 and PT5, a front contact of relay PT6, conductor 167, a back contact of each of relays PTC, UL, PRR and ST2 and the grounded start conductor 118. With relay PT6 operated, the operating circuit of relay PTE is open and with relay PT0 operated, the locking circuit of relay PTE is opened, wherefore relay PTE releases. The aforementioned operation of relay PT0 also opens the connection between conductor 152 and the grounded start conductor 118. The release of relay PTE closes a locking circuit for relay PT0; closes a connection from conductor 154 through a front contact of relay PT0 and a back contact of each of relays PTE, UL, PRR and ST2 to the grounded starting conductor 118; and disconnects ground from conductor 186 by opening its connection with conductor 167, whereby the lower winding of relay PT6 is deenergized. With ground connected to conductor 154 and with relay PT6 operated, a circuit is closed for operatively energizing the winding of relay PT6a in parallel with the upper winding of relay PT6. The operation of relay PT6a connects these windings directly to conductor 167 whereby relays PT6 and PT6a are locked under the control of relays PTC, UL, PRR and ST2 to the grounded start conductor 118.

With relay PT6a operated, the grounded conductor 167 is connected through a front contact of relay PT6a and a back contact of relay PT5a to conductor 185; and, with outgoing trunk relay O5 not operated, this connection is extended through a back contact of relay O5, conductor 175, a back contact of each of relays PR6, PR5, PR4, PR3, PR2 and PR1 of control link CL2, conductor 53, a back contact of relay CT of trunk circuit T5 (not shown), conductor 59, a front contact of relay PR1 of control link CL1, a back contact of relay PR2, a front contact of relay PR3, a back contact of each of relays PR4, PR5, PR6, PR7, PR8, PR9 and PR10, conductor 143, a back contact of relay ROC, to the lower winding of relay PT3. Relay PT3 is thereby operated, and a connection is closed from grounded conductor 154, through a front contact of relay PT3, a front contact of relay PT6, a back contact of relay PT5, and conductor 125 for operating relay PR5 of control link CL1. Relay PR5 locks to conductor 140, opens the above-traced operating circuit of relay PT3 and closes a connection from grounded conductor 59 for operating relay PT5; this connection is traced from conductor 59 through a front contact of relay PR1, a back contact of relay PR2, a front contact of relay PR3, a back contact of relay PR4, a front contact of relay PR5, a back contact of relay PR6, conductor 145 and a back contact of relay ROC to the lower winding of relay PT5. The operation of relay PT5 closes a circuit for operating relay PTE, this circuit being traced through conductor 151, a back contact of each of relays PT1, PT2, PT3 and PT4, a front contact of each of relays PT5 and PT6 and grounded conductor 167. The operation of relay PTE disconnects ground from conductor 154 and opens the locking circuit of relay PT0. Since the operating circuit of relay PT0 is opened by the operation of relay PT5, relay PT0 releases; whereby the grounded conductor 118 is again connected to conductor 152, and this connection is extended through a front contact of relay PT6a, a front contact of relay PT5, and a back contact of relay PT5a to operatively energize the winding of relay PT5a and the upper winding or relay PT5 in parallel. Relay PT5a closes a locking circuit to conductor 167 for holding relays PT5a and PT5 operated under the control of relays PTC, UL, PRR and ST2 to the grounded start conductor 118. The operation of relay PT5a transfers the connection of grounded conductor 167 from conductor 185 to conductor 184, thereby causing the deenergization of the lower winding of relay PT5.

With outgoing trunk relay O4 not operated, the ground connection to conductor 184 is extended through a back contact of relay O4, conductor 174, a back contact of each of relays PR8, PR7, PR6, PR5, PR4, PR3, PR2, and PR1 of control link CL2, conductor 43, a back contact of relay CT of incoming trunk circuit T4 (not shown), conductor 49, a front contact of relay PR1 of control link CL1, a back contact of relay PR2, a front contact of relay PR3, a back contact of relay PR4, a front contact of relay PR5, a back contact of each of relays PR6, PR7 and PR8, conductor 144, a back contact of relay ROC to the lower winding of relay PT4. Relay PT4 operates, closing a circuit for again operating relay PT0, this circuit being traced through conductor 153, a back contact of each of relays PT1, PT2 and PT3 and a front contact of each of relays PT4, PT5 and PT6, to grounded conductor 167. The operation of relay PT0 disconnects ground from conductor 152 and opens the locking circuit of relay PTE; and relay PTE releases since its operating circuit was opened by the operation of relay PT4. With relay PTE released and relay PT0 operated, the grounded conductor 118 is again connected to conductor 154; and this ground connection is extended through a front contact of each of relays PT4, PT6, PT5 and PT5a and a back contact of relay PT4a to the winding of relay PT4a and the upper winding of relay PT4 in parallel. Relay PT4a operates, closing a locking circuit to conductor 167 for holding relays PT4 and PT4a operated under the control of relays PTC, UL, PRR and ST2 to the grounded start conductor 118. The operation of relay PT4a transfers the connection of grounded conductor 167 from conductor 184 to conductor 183, thereby causing the deenergization of the lower winding of relay PT4.

With outgoing trunk relay O3 not operated, the ground connection to conductor 183 is extended through a back contact of relay O3, conductor 173, a back contact of each of relays PR10 to PR1 of control link CL2, conductor 33, a back contact of relay CT in trunk circuit T3 (not shown), conductor 39, a front contact of relay PR1 of control link CL1, a back contact of relay PR2, a front contact of relay PR3, a back contact of relay PR4, a front contact of relay PR5, a back contact of each of relays PR6 to PR10, conductor 143, a back contact of relay ROC to the lower winding of relay PT3. Relay PT3 operates, closing a circuit for again operating relay PTE, this circuit being traced through conductor 151, a back contact of each of relays PT1 and PT2, a front contact of each of relays PT3, PT4, PT5 and PT6 to grounded conductor 167. The operation of relay PTE disconnects ground from conductor 154 and opens the locking circuit of PT0; and relay PT0 releases since its operating was opened by the operation of relay PT3. With relay PT0 released and relay PTE operated, the grounded start conductor 118 is again connected to conductor 152; and this ground connection is extended through a front contact of each of relays PT6a, PT5, PT5a, PT4a and PT3, and a back contact of relay PT3a to the winding of relay PT3a and the upper winding of relay PT3 in parallel. Relay PT3a operates, closing a locking circuit to conductor 167 for holding relays PT3 and PT3a operated under the control of relays PTC, UL, PRR and ST2 to the grounded start conductor 118. The operation of relay PT3a transfers the connection of grounded conductor 167 from conductor 183 to conductor 182, thereby causing the deenergization of the lower winding of relay PT3.

With outgoing trunk relay O2 operated, the ground connection to conductor 182 is extended through the front contact of relay O2, conductor O22, wiper 2 of register R2 of finder-register FR2, a front contact of relay SW2, wiper 4 of finder switch F2, conductor 65, a front contact of each of relays BB and CT of incoming trunk circuit T6, conductor 69, a front contact of relay PR1 of control link CL1, a back contact of relay PR2, a front contact of relay PR3, a back contact of relay PR4, a front contact of relay PR5, a back contact of each of relays PR6, PR7, PR8, PR9, PR10 and PR11, conductor 141, a back contact of relay ROC to the lower winding of relay PT1. Relay PT1 operates, closing a circuit for operating relay PR11 of control link CL1, which circuit is traced through conductor 131, a back contact of relay PT2, and a front contact of each of relays PT3, PT4 and PT1 to grounded conductor 152. Relay PR11 locks to conductor 140 and transfers the above traced ground connection which includes conductors 182 and 69 from conductor 141 to conductor 142, thereby releasing relay PT1 and operatively energizing the lower winding of relay PT2. The operation of relay PT2 closes a circuit for operating relay PT0, this circuit being traced through conductor 153, a back contact of relay PT1, a front contact of each of relays PT2, PT3, PT4, PT5 and PT6 to grounded conductor 167. This operation of relay PT0 disconnects ground from conductor 152 and opens the locking circuit of relay PTE; and relay PTE releases since its operating circuit was opened by the operation of relay PT2. With relay PTE released and relay PT0 operated, the grounded start conductor 118 is again connected to conductor 154, and this ground connection is extended through a front contact of each of relays PT4, PT6, PT5, PT5a, PT4a, PT3a and PT2, conductor 158, a back contact of relay PT2a to the winding of relay PT2a and the upper winding of relay PT2 in parallel. Relay PT2a operates, closing a locking circuit to conductor 167 for holding relays PT2 and PT2a operated under the control of relays PTC, UL, PRR and ST2 to the grounded start conductor 118. The operation of relay PT2a transfers the connection of grounded conductor 167 from conductor 182 to conductor 181, thereby causing the deenergization of the lower winding of relay PT2.

With outgoing trunk relay O1 operated, the ground connection to conductor 181 is extended through a front contact of relay O1, conductor O12, wiper 2 of register R1 of finder-register FR1, a front contact of relay SW1, wiper 4 of finder switch F1, conductor 15, a front contact of each of relays BB and CT of trunk circuit T1, conductor 19, a front contact of relay PR1 of control link CL1, a back contact of relay PR2, a front contact of relay PR3, a back contact of relay PR4, a front contact of relay PR5, a back contact of each of relays PR6, PR7, PR8, PR9 and PR10, a front contact of relay PR11, conductor 141, a back contact of relay ROC, to the lower winding of relay PT1. Relay PT1 operates and is locked through a front contact of each of relays PT2, PT3, PT4, PT5 and PT6 to grounded conductor 167. The operation of relay PT1 closes a circuit for operating relay ROC, which circuit is traced through conductor 150, a front contact of relay PT2a, conductor 155 and a front contact of relay PT1. Relay ROC locks to conductor 140, opens the connections between the lower windings of relays PT1 to PT6 and conductors 141 to 146, connects ground to conductors 139 and 148 and closes a circuit for operating relay PTC; which circuit is traced through conductor 147 and a front contact of relay ROC, thence in parallel with the upper winding of relay PT1, through the locking front contact of relay PT1, a front contact of each of relays PT2 to PT6, conductor 167, inner upper back contact of relay PTC and a back contact of each of relays UL, PRR and ST2 to the grounded start conductor 118. Relay PTC closes its uppermost front contact so as to lock to the start conductor independent of the relays ROC and PT1 to PT6, inclusive, before its operating circuit is opened at the upper back contacts of this relay. With relay PTC operated, conductor 167 is disconnected from the grounded start conductor 118 thereby causing the release of relays PT1 to PT6, PT2a to PT6a and PT0. Relay PRR does not operate at this time since its operating circuit is opened by the operation of relay PTC. Since it has been assumed that none of the PR relays of link CL2 were operated, relay 178 is not operated and it is not necessary to operate relay 179 to unlock and release the PR relays of this link. However, if any of the PR relays and relay 178 of link CL2 are operated at the time relay PTC of the translating circuit operates, an operating circuit is closed for relay 179; and the operation of relay 179 effects the release of the PR relays of link CL2 followed by the successive release of relays 178 and 179. The circuit for operating relay 179 includes the inner front contact of relay 178, conductor 188, a back contact of relay ST2 of the translating circuit, the lower front contact of relay PTC, conductor 148, and a front contact of relay ROC. With both of relays 178 and 179 released and with relay UL1 operated as hereinbefore stated, a circuit is closed for operatively energizing the lower winding of relay ST2 of the translator circuit. This circuit is traced through conductor 187, a back contact of each of relays 178 and 179, conductor 189, a front contact of relay UL1, a back contact of relay UL2, conductor 190, a continuity back contact of relay ST2, the lower front contact of relay PTC, conductor 148 and a front contact of relay ROC.

Relay ST2 operates and closes a locking circuit through its upper winding and inner upper front contact to grounded start conductor 118. Relay ST2 first connects ground directly to conductor 114 so as to continue to hold the gate relay 109, and then opens the connection between conductor 114 and the grounded start conductor 118. The operation of relay ST2 also connects ground directly to conductor 190 to maintain the energization of its lower winding until the condition of one of the UL1 and UL2 relays changes. The operation of relay ST2 also opens the connection between start conductor 118 and the upper transfer contact spring of relay PRR and closes circuits for operating the PR relays of permutation link PL1 in accordance with the setting of the PR relays of control link CL1. These circuits are traced from ground at the back contact of relay 112 of the gate circuit, through conductor 117, lowermost front contact of relay ST2, conductor 119, thence through a front contact of each of the operated PR relays of control link CL1, through the corresponding conductors in the group CW1 to CW11, inclusive, back contacts of relay TF, corresponding conductors in the group AW1 to AW11, inclusive, to the windings of the corresponding PR relays of link PL1. Since in the case assumed, relays PR1, PR3, PR5 and PR11 of control link CL1 have been operated, switching relays PR1, PR3, PR5, and PR11 of link PL1 operate. At the same time, the corresponding ones of relays PR1 to PR11 of control link CL2 are operated since the windings of these relays are also connected to conductors CW1 to CW11 respectively; that is, relays PR1, PR3, PR5 and PR11 of link CL2 operate and lock through conductor 180 to ground at a back contact of relay 179. The operation of these relays of control link CL2 closes a circuit for operating relay 178; and relay 178 closes a circuit for operating gate release relay 111, this circuit being traced through conductor 116, outer front contact of relay 178, back contact of relay 179, conductor 189, front contact of relay UL1, back contact of UL2, conductor 199 to ground at a front contact of relay ST2. The operation of relay 111 closes a circuit for operating relay 112. Relay 112 locks under control of relay 109, disconnects ground from conductor 117, thereby preventing the further operation of PR relays of control link CL2 and permutation link PL1. The aforementioned operation of relay 111 opened the short circuit around the winding of relay 108 so that relay 108 operates. Relay 106 is held operated until relays 111 and 112 release. The operation of relay 108 connects ground to conductor 115 operating transfer relay TF. Relay TF disconnects ground from conductor 192 and connects ground to conductor 191, operating relays 195 and 196; whereby connections are established between incoming trunk circuit T1 and outgoing trunk circuit 210 and between incoming trunk circuit T6 and outgoing trunk circuit 310, these being the connections desired by the subscribers at calling stations W and X, as registered on register switches R1 and R2. The operation of relays 195 and 196 closes a circuit for operating relay UL2. The operation of relay UL2 causes the release of relay 111; and disconnects ground from conductor 194, causing the release of relays 197 and 198 of permutation link PL2 together with any of the switching relays therein which were locked to this conductor. With relays 106, 108 and 112 operated, the release of relay 111 causes the operation of relay 113; relay 113 locks through conductor 114 to ground at a front contact of relay ST2. When all of the relays of link PL2 have released, relay UL1 releases thereby connecting ground to conductor 193 to lock relays 195 and 196 and the operated PR relays of link PL1. The release of relay UL1 causes the reoperation of release relay 111, thereby connecting ground through a front contact of relay 113 and front contacts of relays 101 and 102, to conductors 89 and 99 to operate the BB1 and BB2 relays of finder-register circuits FR1 and FR2. Each of the BB1 and BB2 relays locks under control of the associated one of relays C1a and C2a; disconnects ground from wiper 5 of the associated finder F1 or F2, thereby causing the release of relays CT of the associated incoming trunk circuits T1 and T6; and disconnects ground from conductors 88 and 98, respectively, thereby causing the release of relays 101 and 102 of the gate circuit. The release of relays 101 and 102 disconnects ground from conductor 118 thereby causing the release of relay ST2 of the translating circuit. The release of relay 101 disconnects ground from conductor 87 and the release of relay 102 disconnects ground from conductor 97, whereby relays SW1 and SW2 of the finder-register circuits FR1 and FR2 and outgoing trunk relays O1 and O2 of the translating circuit are released. The release of relay ST2 disconnects ground from conductors 114 and 190. When ground is disconnected from conductor 114, relays 109 and 113 of the gate circuit release; and, when ground is disconnected from conductor 190, relay 111 releases. The release of relay 109 causes the release of relay 112. Relays 106 and 108 remain operated to connect the winding of gate relay 109 to conductor 114 for operation on the next call, during which relays 106 and 108 are released in turn instead of being operated in turn as above described. Relay TF also remains operated until the next call or calls have been received and extended.

The aforementioned release of relay CT in each of trunk circuits T1 and T6 disconnects the lines L1 and L6 from the windings of the A1 and A2 relays respectively in the finder-register circuits, and reconnects these lines to the windings of the A relays of the trunk circuits, thereby reoperating the A and B relays of each of trunk circuits T1 and T6. The release of the A1 relay of finder-register FR1 causes the release of relay B1; and the release of relay B1 causes the release of relays CT1 and C1a. The release of relay CT1 disconnects the windings of relay A1 from conductors 11 and 12 and reconnects start conductor 70 to the stepping magnet FM1 of finder F1. The aforementioned release of relay B1 also causes the operation of release magnet RL1 of register switch R1, whereby this switch is restored to normal. The circuit for operating release magnet RL1 is opened at contacts ON1 when the wipers reach normal position. The finder-register FR2 is restored to normal in like manner.

The aforementioned release of relay CT of trunk circuit T1 closes a circuit from ringing generator 9, through the middle winding of relay D, middle lower front contact of relay RG, conductor 81 through a front contact of relay 195 and contacts of the PR relays and a front contact of relay 196 of link PL1, conductor 212 of the selected outgoing trunk or line, through the ringer (not shown) at the called station Y, back through conductor 211, through a front contact of relay 196 and contacts of the PR relays and a front contact of relay 195 of link PL1, conductor 71, and a front contact of relay RG, to ground. Audible ringing tone is transmitted from conductor 81 through condenser TC to the calling station. When the call is answered at station Y, relay D operates, releasing relays BB and RG and reversing the current over the conductors of line L1. With relays BB and RG released, the ringing circuit is opened and relay D is held operated by the energization of its upper and lower windings in series with conductors 71 and 81, the connection through link PL1, conductors 211 and 212 and the called station. Talking battery is fed to the calling line through the windings of relay A and to the called line through the windings of relay D; and talking current is transmitted through talking condensers TC1 and TC2. When the called station is restored to normal, relay D releases; and, when the calling station is restored to normal, relay A releases. The release of relay A causes the release of relay B. The release of either of relays D or B disconnects the busy marking ground from conductor 91.

The release of relay CT of trunk circuit T2 closes a similar circuit from generator 9 through link PL1 for ringing the called station Z. Relay D operates when the call is answered and relays BB and RG release. Relays A and D remain operated until the calling and called stations restore their telephones to normal. When relays A and D release, relay B is released. The release of either of relays D or B disconnects busy marking ground from conductor 96.

As soon as another call is initiated, the calling line is extended to a finder-register, the called line digit is registered, the gate circuit operates to associate the finder-register with the translating circuit, and the foregoing cycle of operations is repeated to establish the new desired connection and maintain the previous connections which have not been terminated. The relays of the translating circuit and permutation control links which are operated depend upon what connections are required. The following table indicates the control link PR relays which are controlled when ground is successively connected to each of conductors 186, 185, 184, 183 and 182 and indicates which of the PTE and PTO relays is operated.

| Ground Connected to Conductor | PTE or PTO Operated | PR Relays Controlled |
|---|---|---|
| 186 | PTE | PR1, PR2, PR3. |
| 185 | PTO | PR4, PR5, PR6. |
| 184 | PTE | PR7, PR8. |
| 183 | PTO | PR9, PR10. |
| 182 | PTE | PR11. |
| 181 | PTO | |

Upon connection of ground to any one of conductors 186 to 181, this ground is extended under the control of outgoing trunk relays and control links CL1 and CL2 to the required one or more of conductors 141 to 146 depending upon which of the outgoing trunk relays O1 to O6 are operated and what PR relays of control link CL2 are operated at that time. The PR relays of control link CL1 which are operated when ground is connected from each of conductors 186 to 181 to each one of conductors 141 to 146 is indicated by the following table:

| Ground connected from conductor | To conductor | Control link PR relays operated | Translating relay operated |
|---|---|---|---|
| 186 | 141 | PR2, PR3 | |
| 186 | 142 | PR1, PR3 | |
| 186 | 143 | PR3 | |
| 186 | 144 | PR2 | |
| 186 | 145 | PR1 | |
| 186 | 146 | | PT6 |
| 185 | 141 | PR4, PR6 | |
| 185 | 142 | PR6 | |
| 185 | 143 | PR5 | |
| 185 | 144 | PR4 | |
| 185 | 145 | | PT5 |
| 184 | 141 | PR7, PR8 | |
| 184 | 142 | PR8 | |
| 184 | 143 | PR7 | |
| 184 | 144 | | PT4 |
| 183 | 141 | PR10 | |
| 183 | 142 | PR9 | |
| 183 | 143 | | PT3 |
| 182 | 141 | PR11 | |
| 182 | 142 | | PT2 |
| 181 | 141 | | PT1 |

Intermediate ones of the translating relays PT1 to PT6 may be operated and released to finally effect the operation of the PR and PT relays according to the above table.

The intermediate trunk circuit shown in Fig. 11 is similar to the incoming trunk circuits T1 and T6 except that it lacks means for controlling ringing and is not arranged to supply talking battery to calling and called lines. Intermediate trunks may be connected between two sets of permutation links each of which is similar to links PL1 and PL2; and each set of permutation links will have associated therewith control links and a translating circuit similar to those hereinbefore described.

What is claimed is:

1. A switching device comprising a plurality of incoming conductors, a plurality of outgoing conductors, electromagnetically actuated contact means for simultaneously establishing individual direct metallic connections between said incoming and outgoing conductors in any desired permutation, a plurality of electromagnets controlling said contact means, and control means for selectively energizing any one or any combination of two or more of said electromagnets.

2. In a switching device, a plurality of incoming conductors and a like plurality of outgoing conductors, contact means for simultaneously connecting said incoming conductors to said outgoing conductors in any desired permutation, said contact means divided into a plurality of switching stages, each stage comprising one or more relays, each relay having sets of transfer and output contacts, each relay of a stage controlling a plurality of sets of switching contacts, the number of sets of contacts controlled by each relay in a first stage being equal in number to said plurality of incoming conductors and the number of sets of contacts controlled by each relay in each succeeding stage being one less than the number of sets of contacts controlled by each relay of the preceding stage, conductors individually connecting the transfer contacts of each relay except the first relay of the first stage to output contacts of the next preceding relay, said incoming conductors being individually connected to transfer contacts of the first relay of the first stage, said outgoing conductors being individually connected to output contacts of the last relays of said stages, and means for selectively operating said relays to establish individual connections in any desired permutation between said incoming and outgoing conductors.

3. In a switching device, a plurality of incoming conductors and a like plurality of outgoing conductors, contact means for simultaneously connecting said incoming conductors to said outgoing conductors in any desired permutation, said contact means divided into five stages, the last stage comprising one relay having two sets of transfer and output contacts, the fourth stage comprising two relays each having three sets of transfer and output contacts, the third stage comprising two relays each having four sets of transfer and output contacts, the second stage comprising two relays each having five sets of transfer and output contacts and the first stage comprising two relays each having six sets of transfer and output contacts, conductors individually connecting the transfer contacts of each relay except the last to output contacts of the next preceding relay, said incoming conductors being individually connected to transfer contacts of the first relay of the first stage, said outgoing conductors being individually connected to output contacts of the last relays of said stages, and means for selectively operating said relays to establish individual connections in any desired permutation between said incoming and outgoing conductors.

4. A switching device comprising a plurality of first conductors, a plurality of second conductors, a plurality of switching stages each comprising one or more relays having contacts establishing individual direct metallic connections between conductors incoming to the stage and conductors outgoing from the stage, the last stage having two incoming and two outgoing conductors and each stage other than said last stage having one more incoming and one more outgoing conductor than the succeeding stage, said first conductors constituting the incoming conductors of the first stage, the outgoing conductors of each stage other than the last constituting the incoming conductors of the next succeeding stage, one outgoing conductor of each stage other than the last and both outgoing conductors of the last stage constituting said second conductors, and means for selectively changing the operative condition of said relays to individually connect said first conductors to said second conductors in any desired permutation.

5. In a switching system, a plurality of incoming lines and a like plurality of outgoing lines, first and second permutation switching links common to said incoming and outgoing lines, each of said links comprising a series of relays having sets of transfer and output contacts and conductors individually connecting the transfer contacts of each relay except the first to output contacts of the next preceding relay, said incoming lines connected to the transfer contacts of the first relay of both links, one of the output contacts of each relay except the first and the output contacts of the last relay of each link being connected to said outgoing lines, said relays of each link being selectively operable to connect said incoming lines to said outgoing lines in any desired permutation, control means comprising relays common to said lines and said links for effecting the selective operation of the relays of one of said links to interconnect said incoming lines and outgoing lines in a desired permutation and for thereafter effecting the selective operation of the relays of the other of said links to interconnect said incoming and outgoing lines in a different desired permutation.

6. In a switching system, a plurality of incoming lines and a like plurality of outgoing lines, first and second permutation links common to said incoming and outgoing lines, each of said permutation links comprising electromagnetic switching means adapted to establish individual connections between said incoming lines and said outgoing lines in any desired permutation, said first link operated at one time to interconnect said incoming and outgoing lines in a particular permutation and said second link being released, control means common to said lines and links for operating either link to interconnect said incoming and outgoing lines in any desired permutation, said control means comprising third and fourth permutation links, each of said third and fourth links comprising electromagnetic switching means selectively operable to individually connect a number of input control conductors to a like number of outgoing control conductors in any desired permutation, the number of input control conductors of said third and fourth links being equal to said plurality of incoming lines, control relay means for operating said third link in the same permutation as that in which said first link is operated, register means registering one or more desired connections between incoming and outgoing lines, control relay means for operating said fourth link in the permutation in which said second link is to be operated to include said registered desired connections between incoming and outgoing lines and maintain all other connections existing through said first link, and control relay means for operating said second link in the same permutation as is said fourth link and for thereupon releasing said first link.

7. In a switching system, a switching device comprising a plurality of incoming conductors, a plurality of outgoing conductors, electromagnetic means having contacts simultaneously establishing individual metallic connections between said incoming and outgoing conductors, said electromagnetic means being variably operable to establish the interconnection of said incoming and outgoing conductors in any desired permutation, means for registering desired connections between one or more of said incoming conductors and the desired one or more of said outgoing conductors, and control means including translating relays controlled by said register means for selectively operating the electromagnetic means of said switching device to establish said registered desired connections and continue the previously existing connections between all other incoming and outgoing conductors.

8. In a switching system, a plurality of incoming lines, a like plurality of outgoing lines, a switching device comprising two like series of relays each series selectively operable to interconnect said incoming and outgoing lines in any desired permutation, the relays of either series operated at one time to interconnect said lines in a particular one of said permutations while the other set is released and waiting operation, a first register means comprising a number of relays selectively operable to interconnect a number of incoming control and a like number of outgoing control conductors in any desired permutation, said number of incoming conductors being equal to said plurality of incoming lines and the number of register relays being equal to the number of relays in each of said series, means for connecting the relays of said first register means in parallel with the relays of the one series which is then operated thereby to operate the relays of said first register means corresponding to the operated relays of said one series, second register means comprising relay means variably settable to indicate desired connections between one or more of said incoming lines and particular ones of said outgoing lines respectively, and relay means jointly controlled by said first and second registers for operating the other of said series of relays to interconnect said incoming and outgoing lines in a permutation which includes the desired connections indicated by the setting of said second register means and continue all other connections between incoming and outgoing lines.

9. A unitary electromagnetically actuated switching device for simultaneously connecting each one of a plurality of incoming conductors to a different one of a plurality of outgoing conductors in any desired permutation of such connections, said device comprising a series of relays less in number than the number of connection permutations, said incoming conductors being individually connected to transfer contacts of a first one of said relays, conductors connecting the transfer contacts of each succeeding relay to output contacts of the next preceding relay, said relays being divided into switching stages one or more relays per stage, one of the output contacts of the last relay of each stage and all of the output contacts of the last relay being individually connected to said outgoing conductors, means for selectively operating said relays to establish any desired connection permutation, and additional relay means for completing the connections between the incoming and outgoing conductors in any established connection permutation.

10. In an automatic switching system comprising switching means for interconnecting incoming and outgoing lines, means for registering the identity of each of one or more incoming lines and the identity of each outgoing line to which an incoming line is to be individually connected, and means including translating relays operable in accordance with the settings of said register means to selectively control said switching means to simultaneously and individually connect each of said one or more incoming lines to the particular one of said outgoing lines with which it is desired that connection be established as indicated by said register means.

11. In an automatic switching system comprising switching means for interconnecting incoming and outgoing lines, a single unitary control means for controlling said switching means, said control means comprising means for registering the identity of each of one or more incoming lines and the identity of each outgoing line to which a calling line is to be individually connected, and means including translating means operable in accordance with the setting of said register means for selectively controlling said switching means to individually and simultaneously connect each of said one or more incoming lines to the particular one of said outgoing lines with which it is desired that connection be established as indicated by said register means.

12. In an automatic switching system, a plurality of incoming lines, a plurality of outgoing lines, electromagnetically actuated switching means operable to establish individual connections between any incoming line and a desired one of the outgoing lines, register means for registering the identity of each incoming line which it is desired to connect with an outgoing line and the identity of the particular outgoing line to which the incoming line is to be connected, and a single cyclically operable translating and control means comprising relays common to said lines and register means and rendered effective responsive to the operation of said register means to control the operation of said switching means to establish during each cycle of the operation of said control means all the desired connections registered at the beginning of the cycle.

13. In an automatic switching system comprising switching means according to claim 9 for interconnecting incoming and outgoing lines, a single unitary control means for controlling said switching means to establish desired individual connections between said incoming and outgoing lines, said control means comprising means for registering the identity of one or more incoming lines awaiting connection to outgoing lines and the identity of the outgoing line with which each particular one of said one or more incoming lines is to be connected, means for registering the connection permutation existing in said switching means between said incoming and outgoing lines, and means including translating relays operable in accordance with the settings of both of said registering means for controlling the operation of said switching means to individually connect each of said one or more registered incoming lines to the desired registered outgoing line and to continue the existing connections between the remainder of said incoming and outgoing lines 14. A switching device for individually and selectively connecting a plurality of incoming lines to a like plurality of outgoing lines in any permutation, said device consisting of a series of switching stages, each stage consisting of one or more relays, each relay having a plurality of sets of switching contacts, a plurality of input conductors individually connected to the transfer contacts of each relay and a like plurality of output conductors connected to the output contacts whereby the contacts of each relay connects its input conductors to its ouput conductors in the one or the other of two permutations depending upon whether the relay is operated or released, the relays of each stage having the same number of sets of switching contacts connecting input and output conductors, and the relays of the second and each succeeding stage having one less set of switching contacts connecting input and output conductors than the relays of the preceding stage, the input conductors of the first relay of the device constituting said incoming lines and the input conductors of each succeeding relay of the device constituting output conductors of the next preceding relay, one of the output conductors of the last relay of each switching stage and all of the output conductors of the last relay of the last stage constituting said outgoing lines, and means for selectively operating said relays in any desired permutation.

AMOS E. JOEL, Jr.

REFERENCES CITED

The following references are of record in the file of this patent:

UNITED STATES PATENTS

| Number | Name | Date |
| --- | --- | --- |
| 1,710,490 | Richardson | Apr. 23, 1929 |
| 1,844,256 | Langer | Feb. 9, 1932 |
| 1,872,558 | Bellamy | Aug. 16, 1932 |
| 2,244,914 | Mai | June 10, 1941 |
| 2,422,565 | Powell | June 17, 1947 |